United States Patent
Gruhn et al.

(12) 
(10) Patent No.: US 6,284,367 B1
(45) Date of Patent: Sep. 4, 2001

(54) PROCESS FOR THE PREPARATION OF NONWOVEN WATER BLOCKING TAPES AND THEIR USE IN CABLE MANUFACTURE

(75) Inventors: Joel David Gruhn, Barrington, RI (US); Phillip Douglas Shows, Hudson, NC (US); Stuart P. Fairgrieve, Kidlington; Jennifer Clare Watts, Yarnton, both of (GB)

(73) Assignee: Neptco, Inc., Pawtucket, RI (US)

( * ) Notice: Subject to any disclaimer, the term of this patent is extended or adjusted under 35 U.S.C. 154(b) by 0 days.

(21) Appl. No.: 08/748,651

(22) Filed: Nov. 14, 1996

(51) Int. Cl.⁷ ............................. B32B 15/04; C08F 20/44
(52) U.S. Cl. ................................. 428/355 AC; 428/351; 428/355 EN; 428/355 R; 525/329.2; 525/329.3; 525/330; 525/919
(58) Field of Search ................................. 428/288, 290, 428/351, 355 R, 355 AC, 355 EN; 525/329.2, 330, 919, 329.3

(56) References Cited

U.S. PATENT DOCUMENTS

| | | | |
|---|---|---|---|
| 3,926,981 | 12/1975 | Clauss et al. | 260/243 R |
| 3,966,679 | 6/1976 | Gross | 260/47 EA |
| 4,017,653 | 4/1977 | Gross | 427/385 A |
| 4,090,013 | 5/1978 | Ganslaw et al. | 526/15 |
| 4,154,898 | 5/1979 | Burkholder, Jr. | 428/500 |
| 4,322,574 | 3/1982 | Bow et al. | 174/107 |
| 4,837,077 | 6/1989 | Anton et al. | 428/240 |
| 4,963,695 | 10/1990 | Marciano-Agostinelli et al. | 174/23 C |
| 5,010,209 | 4/1991 | Marciano-Agostinelli et al. | 174/23 C |
| 5,020,875 | 6/1991 | Arroyo et al. | 350/96.23 |
| 5,188,883 | 2/1993 | Rawlyk | 428/189 |
| 5,204,175 | 4/1993 | Umeda et al. | 428/288 |
| 5,280,079 | 1/1994 | Allen | 525/329.2 |

FOREIGN PATENT DOCUMENTS

| | | | |
|---|---|---|---|
| 0 024 631 A1 | 3/1981 | (EP) | H01B/7/28 |
| 0 357 474 A1 | 3/1990 | (EP) | A61L/15/00 |
| 0 482 703 A1 | 4/1992 | (EP) | D06M/15/285 |
| 0 558 207 A2 | 9/1993 | (EP) | H01B/7/28 |
| 0 685 855 A1 | 12/1995 | (EP) | H01B/7/28 |
| 0 702 031 A2 | 3/1996 | (EP) | C08F/8/00 |
| 4-257441 | 9/1992 | (JP) | B32B/27/30 |
| 5-194798 | 10/1992 | (JP) . | |
| 5-148475 | 6/1993 | (JP) | C09K/3/10 |
| 7-292142 | 11/1995 | (JP) | C08J/7/16 |
| 7-306343 | 11/1995 | (JP) | G02B/6/44 |
| WO 96/23024 | 8/1996 | (WO) | C08J/7/04 |

Primary Examiner—Marianne P. Allen
Assistant Examiner—M. K. Zeman
(74) Attorney, Agent, or Firm—Mintz, Levin, Cohn, Ferris, Glovsky and Popeo, P.C.

(57) ABSTRACT

A process for the manufacture of a nonwoven water blocking tape for use in cable manufacture, which process comprises the steps of:

(i) forming a coating of an aqueous solution of a water soluble polymer containing anionic groups and a multivalent ionic crosslinking agent on at least one surface of a nonwoven substrate material; and (ii) drying and/or curing the coating in order to form a partially crosslinked water swellable polymer coating on the at least one surface of the nonwoven substrate material.

Water blocking tapes are also provided which comprise a nonwoven substrate material having a coating on at least one surface thereof of a water soluble polymer containing anionic groups which is partially crosslinked with a multivalent ionic crosslinking agent.

10 Claims, No Drawings

PROCESS FOR THE PREPARATION OF NONWOVEN WATER BLOCKING TAPES AND THEIR USE IN CABLE MANUFACTURE

BACKGROUND OF THE INVENTION

The present invention relates to a process for the preparation of nonwoven water blocking tapes and to the use of such tapes in cable manufacture and, in particular, their use in the manufacture of communications cables using fibre optics. Cables, in particular communication cables using fibre optics, can quickly be damaged by water ingress, particularly if the water travels along the inside of the cable to splices, junctions, signal boosters etc. In the case of underwater or buried cables this problem can be quite serious. The ingress of water into the cable may be simply by the diffusion of water through the outer polymeric jacket, or by rupture of the outer jacket. Rupturing of the outer jacket may be caused by rodent or insect attack, by impact or by abrasion.

PRIOR ART

A number of methods exist for combating this problem. The most widely used approach is to fill the inner regions of the cable with a hydrophobic gel-like compound, such as that sold under the Trade Name Rheogel. This approach suffers from a number of disadvantages, including inefficiency of filling all of the voids within the cable, the process is messy and time consuming, and the adhesion of cable splices is difficult to achieve due to the gel interfering with welding operations or adhesives.

Superabsorbent polymers, e.g. partially crosslinked polymers which absorb many times their own weight in water, and swell considerably without dissolving, to form a gel have also been used. Such superabsorbent polymers have been provided in the form of wide sandwich tapes consisting of a layer of a superabsorbent polymer powder-sandwiched between two layers of a non-woven fabric. Tapes of this type have been described, for example, in U.S. Pat. No. 4,837,077 and EP-A-0024631. However, these products are expensive and cause considerable unwanted increases in cable diameters due to their thickness.

Fibrous substrates with superabsorbent polymer incorporated therein, such as aramid substrates, have also been used, particularly as strengthening wraps for the inner portions of cables. Substrates of this type have been described in EP-A-0482703. However, the methods used to deposit the superabsorbent onto the fibers are not particularly effective and do not result in a high level of superabsorbent on the fibrous substrate. Furthermore, the fibers are not effectively bound together which leads to potential problems of loose fibers during cable assembly processes. Some methods of applying the superabsorbent to the fibers involve the use of organic solvents, with consequential environmental concerns.

In EP-A-0685855 we describe a water blocking composite for use in cables which comprises a strengthening member or buffer tube impregnated with or coated with a mixture of a thermoplastic resin and a water-swellable particulate material. Although these water blocking composites possess certain advantages, they are based on thermoplastic resins which limits their mode of application and the thickness of the coatings that can thereby be applied.

U.S. Pat. No. 5,188,883 discloses a composite tape structure for use in cables having a metal tape layer and a layer of a swellable water blocking material bonded thereto. The layer of water blocking material may be formed from tape impregnated with or provided with a particulate swelling material, or the particulate material may be applied directly to and bonded to the metal tape layer.

U.S. Pat. No. 5,204,175 discloses a water blocking tape made by impregnating a fabric substrate with a metal salt of acrylic acid in monomeric form, a covalent crosslinking agent and a water soluble resin, and then heating the impregnated fabric substrate to copolymerise the monomer and the crosslinking agent in the presence of the water soluble resin.

U.S. Pat. No. 3,966,679 discloses water swellable absorbent articles made from carboxylic polyelectrolytes crosslinked with a crosslinking agent reactive with the carboxylic groups. Suitable crosslinking agents are polyhaloalkanols, sulfonium zwitterions, haloepoxy-alkanes and polyglycidic ethers. Crosslinking agents of this type are disclosed in U.S. Pat. No. 3,926,981. Many of these crosslinking agents are toxic and/or can produce harmful by-products during use. Furthermore, viscosity of the coating formulations is very high which makes it difficult to apply the compositions uniformly. The coating formulations also have a limited shelf life.

U.S. Pat. No. 4,090,013 discloses covalently crosslinked systems which have a limited shelf life and high viscosity.

U.S. Pat. No. 5,280,079 discloses an extruded water absorbent, water insoluble polymeric element that is a crosslinked copolymer of a water soluble blend of water soluble ethylenically unsaturated monomer blends comprising carboxylic and hydroxylic monomers. The crosslinking is generally effected by irradiation or heating the polymer to a temperature of above 150° C.

EP-A-0357474 discloses a fabric impregnated with a formulation which crosslinks in situ on heating to form an absorbent polymer.

U.S. Pat. No. 4,017,653 discloses water swellable absorbent articles which are coated with a dry water swellable polyelectrolyte formed by coating the article with a solution of a carboxylic synthetic polyelectrolyte and a covalent crosslinking agent, and heating the coated article to crosslink the polyelectrolyte. The absorbent articles are generally coated fibrous substrates which can be used in forming diapers, tampons, meat trays or bath mats. Also disclosed are free standing films of the water swellable polyelectrolyte.

EP-A-0702031 discloses an aqueous composition of an absorbent polymer for use in preparing superabsorbent materials such as superabsorbent cellulosic fibers and superabsorbent nonwoven webs. The aqueous polymer composition comprises 20–90% of an α, β- ethylenically unsaturated carboxylic acid monomer and at least one softening monomer, the aqueous composition being adjusted to pH 4–6 with an alkali metal hydroxide or an alkaline earth metal hydroxide and containing a divalent or trivalent metal crosslinking compound.

We have now developed a process for the preparation of nonwoven water blocking tapes for use in the manufacture of cables which does not involve the use of particulate water swellable materials, the use of thermoplastic binder resins or the use of covalent crosslinking agents which may be toxic and difficult to handle, or which produce toxic by-products during use.

SUMMARY OF THE INVENTION

Accordingly, the present invention provides a process for the manufacture of a nonwoven water blocking tape for use in cable manufacture, which process comprises the steps of:

(i) forming a coating of an aqueous solution of a water soluble polymer containing anionic groups and a multivalent ionic crosslinking agent on at least one surface of a nonwoven substrate material; and (ii) drying and/or curing the said coating in order to form a partially crosslinked water swellable polymer coating on the said at least one surface of the nonwoven substrate material.

In another aspect the present invention provides a water blocking tape which comprises a nonwoven substrate material as above defined having a coating on at least one surface thereof of a water soluble polymer containing anionic groups which is partially crosslinked with a multivalent ionic crosslinking agent.

DETAILED DESCRIPTION OF THE INVENTION

Nonwoven substrate materials which can be coated in accordance with the present invention include those which are formed from fibers of natural cellulose materials, such as woodpulp, cotton and hemp; synthetic cellulose fibers, such as rayon; regenerated cellulose fibers; synthetic fibers such as polyamide, nylon, polyester, acrylic or polyolefin fibers. The fibers may be used alone or in combination with one another.

Techniques for forming nonwoven substrate materials are known and the starting fibers can be formed by any one of the conventional techniques including carding, air-laying, wet-laying etc. Generally, the fibers will extend in a plurality of diverse directions in general alignment with the plane of the fabric but forming an open porous structure.

The water soluble polymer used in the present invention contains anionic groups which are preferably selected from carboxyl, sulfonate, sulfate or phosphate groups, most preferably carboxylate groups. Examples of water soluble polymers for use in the invention are acrylic or methacrylic acid (co)polymers, itaconic acid (co)polymers, maleic anhydride copolymers, carboxymethylcellulose, 2-acrylamide-2-methylpropane sulfonic acid (co)polymers (such as AMPS from Lubrizol Corporation), polysaccharides and carboxymethyl starches. The most preferred polymers are acrylic and methacrylic acid homopolymers and the (co)polymers thereof.

The description of the process of the present invention will be made with reference to acrylic and methacrylic acid (co)polymers, but it will be understood that this is by way of example only, the process being applicable to the preparation of coatings based on other water soluble polymers as discussed above.

In carrying out the process of the present invention one or both sides of the nonwoven substrate material has a coating of an acrylic or methacrylic acid (co)polymer and a multivalent ionic crosslinking agent formed thereon. Generally, the coating will be formed as a continuous or discontinuous pattern on the substrate surface as a single step process by coating the nonwoven substrate with a coating solution comprising an aqueous solution of an acrylic or methacrylic acid (co)polymer containing the multivalent ionic crosslinking agent. The coating formulation is generally prepared by preparing an aqueous solution of the acrylic- or methacrylic acid (co)polymer and then optionally partially saponifying the acid, for example with an alkali metal hydroxide. The solution is then neutralized or maintained at a pH of above 7 and the required level of a multivalent ionic metal salt is added thereto. Alternatively, the coating formulation may be prepared by adding the multivalent ionic crosslinking agent to the solution of the partially neutralized or unneutralized acid (which will result in solids precipitation and/or gel formation) and then adding a base to redissolve the solids and provide the desired coating formulation. The pH of the solution is maintained at above 7 in order that the polymer and the multivalent metal ions remain in solution without crosslinking until the solution has been coated onto the substrate surface and the coating dried or cured in order to form a partially crosslinked water swellable polymer coating on the said surface. The pH of the solution may be adjusted, for example, with a combination of ammonium carbonate and ammonium hydroxide, or ammonium hydroxide alone. Once the solution has been coated onto the substrate, the loss of ammonia and water in step (ii) of the process of the invention results in activation of the crosslinking agent and the formation of the partially crosslinked water swellable polymeric material.

It will be understood by those skilled in the art that the coating on the substrate surface may be formed by first coating the substrate with a solution of an acrylic or methacrylic acid (co)polymer and thereafter applying a coating of a multivalent ionic crosslinking agent thereto. It is preferred, however, to apply both the polymeric material and the multivalent ionic crosslinking agent as a single solution.

The molecular weight of the starting polymeric material should be such that the final coating exhibits good film-forming properties and is preferably in the range of from 100,000 to 300,000. The polymer solution which is applied to the surface of the substrate will generally have a solids concentration in the range of from 1 to 50% by weight, preferably from 5 to 25% by weight, the actual value to be used depending upon the solution viscosity required in the particular coating method selected for coating the substrate surface. The amount of the multivalent ionic crosslinking agent which is incorporated into the coating will depend upon the required gel forming properties of the water swellable coating. Low levels of the ionic crosslinking agent will tend to give fast water uptake rates, but relatively weak gels, whilst higher levels will provide slower water uptake rates but stronger gels. Generally, the level of the ionic crosslinking agent will be in the range of from 0.001 to 0.1 molar equivalents, preferably 0.02 to 0.05 molar equivalents, of the multivalent ions based on the polymer.

The multivalent crosslinking agent preferably comprises an iron, aluminum or zirconium salt, or mixture thereof. Ammonium zirconium carbonate is the preferred salt for use in the present invention.

Other additives may be used in the coatings of the present invention, for example anti-blocking agents, colorants, heat stabilizers, surfactants, miscible co-solvents, such as lower alcohols, or any other additives known in the art.

The polymer solution may be incorporated onto or into the chosen nonwoven substrate by any of a variety of well established methods, such as impregnation by dipping in a suitable bath, gravure printing, screen printing, spraying, doctor blade spreading or roller coating. The process of the present invention will generally be carried out using a wide film or sheet of material, which will then be cut to the required tape widths in a subsequent process.

It will be understood by those skilled in the art that the substrate which is treated in accordance with the process of the present invention may, if required, be pre-treated in order to increase its receptivity to the application of the coating compositions used in the present invention. Such pre-treatments may include plasma treatment, flame treatment, chemical etching, or the use of a primer coating.

The nonwoven water blocking tapes of the present invention and the process for their production possess certain advantages over the prior art. The water blocking tapes of the present invention do not have any lower thickness limit which is dictated by the particle size of prior art particulate water swellable polymeric materials and no binder polymer is required. Accordingly, the coating is a completely water swellable, active polymer. The coated water blocking tape has a good flexibility and this lends to its use of application in the formation of the cables. The water blocking tapes of the present invention are prepared by a process which is aqueous based, and uses cheap polymeric starting materials. The ionic crosslinking agents which are used in the process are easier to disperse than covalent crosslinking agents and are less toxic and more easily handled than the covalent crosslinking agents used in the art.

The viscosity of the coating formulations can be varied over a wide range in order to suit a variety of coating methods and coating weights. Furthermore, the general strength of the polymeric material on uptake of water can be controlled in order to suit individual cable design criteria. The process of the invention is applicable to the coating of a wide variety of substrates and thus can be used to coat components which are already used in a cable design and thus a cable can be rendered water blocking with virtually no increase in the complexity of assembly and the diameter of the cable with a minimum increase in weight. In the preferred embodiment of the invention the pH is used to control the activity of the ionic crosslinking agent and this provides the coating formulation with a good shelf life prior to application and use.

The present invention also includes within its scope a cable which incorporates therein a water blocking tape as hereinbefore described. The nonwoven water blocking tape may be incorporated into the cable assembly by a variety of means, preferably spirally wrapped or longitudinally wrapped. The tape may be wrapped around the assembled inner portions of the cable, just underneath the final outer polymeric jacket, or may be positioned around any or all of the separate components which make up the cable assembly. In either position, the nonwoven water blocking tape may itself be wrapped with other tapes, such as nonwovens, plastic films or metal foils, or may be wrapped with strengthening materials such as glass, thermoplastic, or aramid fibers.

It is considered surprising that the nonwoven water blocking tapes of the present invention can be used in cable manufacture since the superabsorbent with which they are coated has been suggested by some authors to be susceptible to dissolution, rather than to swelling, if they encounter bases in subsequent use. Groundwater is often at an alkaline pH and, accordingly, it would have been considered prior to the present invention, that nonwoven water blocking tapes of the type as described in the present invention would not be satisfactory in such situations.

In the well documented use of superabsorbent polymers of the type used in the present invention in diapers and other incontinence products, the entire amount of the superabsorbent encounters liquid at one time and a high pH flood of this type will at least partially dissolve the product. The swelling rate and final level of the superabsorbent will thus be compromised. A composite of this type could not be tolerated in cable applications. However, in a cable suffering a cable jacket breach in the presence of alkaline groundwater, the water will enter the cable and travel a short distance where it encounters the superabsorbent which partially dissolves in the high pH groundwater. The pH of the incoming groundwater is however reduced as a result of this reaction and it travels a short distance where it encounters fresh superabsorbent which it can no longer dissolve. This region therefore swells with water and still forms an effective block to further water traveling along the cable. Surprisingly, therefore, the tendency of the ionically crosslinked superabsorbent to dissolve in high pH water is not a significant drawback in cable applications.

In summary, the present invention possesses the following advantages over the prior art systems previously described:

(i) The coating composition is an aqueous based system.

(ii) The ionic crosslinking agent is nontoxic, unlike many of the covalent crosslinking agents suggested for use in the prior art. Furthermore, the level of the ionic crosslinking agent can be controllably varied in order to provide water uptake properties in the final product which are tuned to the cable application requirements. Furthermore, the level of the crosslinking agent in the coating composition may be varied by simple addition of more of the crosslinking agent.

(iii) Certain other systems produce toxic by-products, such as formaldehyde. Whilst the process of the present invention produces ammonia during preparation and processing of the coating solution, this material can be easily handled.

(iv) Good gel strengths are obtained from the coating formulation of the present invention, with no sign of growth of microorganisms.

(v) The viscosities of the coating formulations are low and can be varied to suit the particular coating method to be used in the invention.

(vi) The shelf-life of the coating formulations is good and, in lidded containers, is extensive. In unlidded containers some ammonia will be lost from the system, but the viability of the coating formulations may be restored by the addition of base without affecting the final products.

The present invention will be further described with reference to the following Examples. In the examples, viscosities were measured using a Brookfield DV-1+ viscometer, No. 2 spindle, at 12 rpm, except for examples 6 and 7 where a No. 2 spindle at 30 rpm was used.

EXAMPLE 1

279 g of a 25% solution of polyacrylic acid of molecular weight 243,000 was 50% saponified by the addition of 19.4 g of sodium hydroxide. This solution was then basified by the addition of 29.1 g of crushed ammonium carbonate, and the final pH adjusted to >8.5 by the addition of a small amount of ammonium hydroxide. 5.45 g of a 50% solution of ammonium zirconium carbonate (Bacote 20; Magnesium Elektron Ltd.) was added dropwise to provide a final formulation containing 0.01 molar equivalents of zirconium ions as crosslinking agent with respect to the polyacrylic acid. The resultant coating formulation had a viscosity of 3000 cP.

This formulation was then coated onto a 16.95 g/m$^2$ polyester nonwoven tissue, using a wire-wound coating bar. The sample was dried in air at room temperature for 1 hour and then in a forced air oven at 100° C. for a further 1 hour. The dry coating weight was 41.9 g/m$^2$.

The water swelling performance of the product was assessed by immersing sample pieces in tap water at 20° C. for timed intervals. The rate of water uptake was estimated by performing a linear regression analysis on the values for uptake up to 60 s immersion. Swell height was measured on swollen samples, noting that the initial thickness of the dry coated nonwoven was 0.15 mm. The strength of the gel formed was comparatively assessed by placing a circular plate of area 2.545 cm² onto the wet sample, and adding weight until an imprint 0.5 mm in depth had been achieved. The results are given below —the immersion uptake is measured in g/m² and as grams water per grams polymer loading. The "gel strength" is quoted in g/cm² load.

| | |
|---|---|
| Immersion uptake | 1068.2 g/m² = 25.5 g water/g polymer |
| Rate | 0.38 water/g polymer/sec |
| Swell Height | 1.0 mm |
| Gel Strength | 2.7 g/cm² |

EXAMPLE 2

A coating formulation was prepared in the same manner as in Example 1, but with the addition of 0.02 molar equivalents of zirconium ions. The resultant coating formulation had viscosity of 3000 cP.

The formulation was coated onto a 16.95 g/m² polyester nonwoven tissue to a dry coating weight of 54.6 g/m². The water swelling performance of the product was assessed according to the procedure of Example 1. The following results were obtained:

| | |
|---|---|
| Immersion uptake | 1940.6 g/m² = 35.5 g water/g polymer |
| Rate | 0.56 g water/g polymer/sec |
| Swell Height | 3.0 mm |
| Gel Strength | 3.6 g/cm² |

EXAMPLE 3

A coating formulation was prepared in the same manner as in Example 1, but with the addition of 0.03 molar equivalents of zirconium ions. The resultant coating formulation had a viscosity of 3000 cP.

The formulation was coated onto a 16.95 g/m² polyester nonwoven tissue to a dry coating weight of 47.6 g/m². The water swelling performance of the product was assessed according to the procedure of Example 1. The following results were obtained:

| | |
|---|---|
| Immersion uptake | 2163.1 g/m² = 45.5 g water/g polymer |
| Rate | 0.71 g water/g polymer/sec |
| Swell Height | 4.0 mm |
| Gel Strength | 5.4 g/cm² |

EXAMPLE 4

A coating formulation was prepared in the same manner as in Example 1, but with the addition of 0.04 molar equivalents of zirconium ions. The resultant coating formulation had a viscosity of 3000 cP.

The formulation was coated onto a 16.95 g/m² polyester nonwoven tissue to a dry coating weight of 56.7 g/m². The following results were obtained:

| | |
|---|---|
| Immersion uptake | 1702 g/m² = 30 g water/g polymer |
| Rate | 0.46 water/g polymer/sec |
| Swell Height | 2.5 mm |
| Gel Strength | 10.0 g/cm² |

EXAMPLE 5

279 g of a 25% solution of polyacrylic acid of molecular weight 243,000 was 50% saponified by the addition of 19.4 g sodium hydroxide. This solution was then basified, to pH>8.5, by the addition of 35 ml ammonium hydroxide. 16.35 g of a 50% solution of ammonium zirconium carbonate (Bacite 20; Magnesium Elektron Ltd) was added, to provide a final formulation containing 0.03 molar equivalents of zirconium ions as crosslinking agent with respect to the polyacrylic acid. The resultant coating formulation had a viscosity of 3100 cP.

The formulation was coated onto a 16.95 g/m² polyester nonwoven tissue to a dry coating weight of 50.0 g/m². The water swelling performance of the product was assessed according to the procedure of Example 1. The following results were obtained:

| | |
|---|---|
| Immersion uptake | 1920 g/m² = 38.4 g water/g polymer |
| Rate | 0.67 g water/g polymer/sec |
| Swell Height | 3.5 mm |
| Gel Strength | 4.9 g/cm² |

EXAMPLE 6

55.8 g of the polyacrylic acid solution used in the previous Examples was made up to 279 g with deionized water to provide a 5% solution of the polymer. This solution was 50% saponified with 3.87 g sodium hydroxide. 34.4 ml of a 1% solution of aluminum chloride was added slowly, to give 0.014 molar equivalents of aluminum ions as crosslinking agent with respect to the polyacrylic acid. A white precipitate was formed, which readily dissolved on the addition of 10 ml ammonium hydroxide. The resultant coating formulation had a viscosity of 52 cP.

A 33.91 g/m² polyester nonwoven tissue was coated with the above formulation using a wire wound coating bar to and dried in the manner detailed in Example 1. The dry polymer coating weight was 25.6 g/cm². The coated sample thickness was about 0.3 mm. The water swelling performance of the product was assessed according to the procedure of Example 1. The following results were obtained:

| | |
|---|---|
| Immersion uptake | 575.3 g/m² = 22 g water/g polymer |
| Swell Height | 1 mm |

EXAMPLE 7

A coating formulation was prepared in the same manner as Example 6, but with the use of an appropriate amount of 1% ferric chloride solution to give 0.014 molar equivalents of ferric ions as the crosslinking agent with respect to the polyacrylic acid. The resultant coating formulation has a viscosity of 51 cP.

A 33.91 g/m² polyester nonwoven tissue was coated with the above formulation using a wire wound coating bar to and dried in the manner detailed in Example 1. The dry polymer coating weight was 20.7 g/cm². The coated sample thickness was about 0.3 mm. The water swelling performance of the product was assessed according to the procedure of Example 1. The following results were obtained:

| | |
|---|---|
| Immersion uptake | 400 g/m² = 19.3 g water/g polymer |
| Swell Height | 1 mm |

EXAMPLE 8

A number of other substrates were coated with the coating formulation of Example 3, and the 60 second immersion water uptakes measured.

| Substrate | Uptake (g water/g polymer) |
|---|---|
| 24 g/m² Polypropylene | 30.0 |
| 34 g/m² Glass Tissue | 21.8 |
| 13 g/m² Aramid Tissue | 31.9 |
| 13.5 g/m² Ni Coated Carbon Tissue | 28.4 |
| 50 g/m² Cotton Mulsin | 28.3 |

EXAMPLE 9

A sample of 33.91 g/m² polyester nonwoven tissue was coated with a formulation similar to those used in Examples 1 to 4, but with no crosslinking agent present. After being partially dried, the sample was sprayed with a 5% solution of ammonium zirconium carbonate (Bacote 20 - Magnesium Elektron Ltd.) and dried in the manner as described in Example 1. The dry coating weight was 67.1 g/m². The water swelling performance of the product was assessed according to the method of Example 1. In the 60 second immersion test the water uptake was about 1000 g/m², approximating to 15 g water/g polymer. A stiff gel resulted with a swell height of between 1.5 and 2.0 mm.

EXAMPLE 10

Tapes prepared as in Example 3 were used to construct simulated cables for testing. A 1 m length of 1 cm diameter polyethylene rod was longitudinally wrapped with the tape, and a heat shrinkable clear jacket placed over this construction (the tube had final inner diameter of about 1.3 cm). This open ended cable simulation was then exposed at one end to a 1 m head of water, and the travel of this water along the sample assessed over a period of 24 hours. The test was carried out with both normal tap water, and a pH 10 buffered solution. In each case, the water traveled about 10 cm along the sample within the first 30 minutes, and then halted. After 24 hours, no further movement of the water front was noted. No significant difference was noted between the two tests carried out. This demonstrates that, in a cable situation, the alleged sensitivity of the water blocking tape to high pH is not relevant.

What is claimed is:

1. A nonwoven water blocking tape for use in cable manufacture which comprises a nonwoven substrate having at least one surface with a coating of a water soluble polymer comprising an acrylic or methacrylic acid homopolymer containing anionic groups which is partially crosslinked with a multivalent ionic crosslinking agent.

2. A water blocking tape as claimed in claim 1 wherein the water soluble polymer contains anionic groups selected from the group consisting of carboxyl, sulfonate, sulfate and phosphate anionic groups.

3. A water blocking tape as claimed in claim 1 wherein the water soluble polymer comprises a polyacrylic acid neutralized with an alkali metal.

4. A water blocking tape as claimed in claim 1 wherein the water soluble polymer comprises a polyacrylic acid having a molecular weight in the range of from 100,000 to 300,000 Daltons.

5. A water blocking tape as claimed in claim 1 wherein the water soluble polymer is crosslinked with a crosslinking agent selected from the group consisting of iron, aluminum and zirconium ions.

6. A water blocking tape as claimed in claim 1 wherein the water soluble polymer is crosslinked with zirconium ions.

7. A water blocking tape as claimed in claim 1 wherein the multivalent cross-linking agent is present in an amount of from 0.001 to 0.1 molar equivalents based on the water soluble polymer.

8. A water blocking tape as claimed in claim 1 wherein the multivalent cross-linking agent is present in an amount of from 0.02 to 0.05 molar equivalents based on the water soluble polymer.

9. A nonwoven water blocking tape for use in cable manufacture which comprises a nonwoven substrate having at least one surface with a coating of a water soluble polymer comprising an acrylic or methacrylic acid homopolymer containing anionic groups which is partially crosslinked with a multivalent ionic crosslinking agent, said polymer being prepared by a process comprising the steps of:

(i) forming on at least one surface of said nonwoven substrate material a coating of an aqueous solution of a water soluble polymer containing anionic groups and a multivalent ionic crosslinking agent; and (ii) drying said coating in order to form a partially crosslinked water swellable polymer coating on at least one surface of the nonwoven substrate material.

10. A nonwoven water blocking tape as claimed in claim 9 wherein said drying step further comprises curing said coating on at least one surface of a nonwoven substrate material.

* * * * *

Disclaimer 6,284,367—Joel David Gruhn, Barrington, RI; Phillip Douglas Shows, Hudson, NC; Stuart P. Fairgrieve, Kidlington; Jennifer Clare Watts, Yarnton, both of Great Britain. PROCESS FOR THE PREPARATION OF NONWOVEN WATER BLOCKING TAPES AND THEIR USE IN CABLE MANUFACTURE. Patent dated September 4, 2001. Disclaimer filed October 12, 2001, by assignee, Neptco, Inc.

Hereby enters this disclaimer to claim 2 of said patent.

*(Official Gazette, May 7, 2002)*